United States Patent Office 3,509,825
Patented May 5, 1970

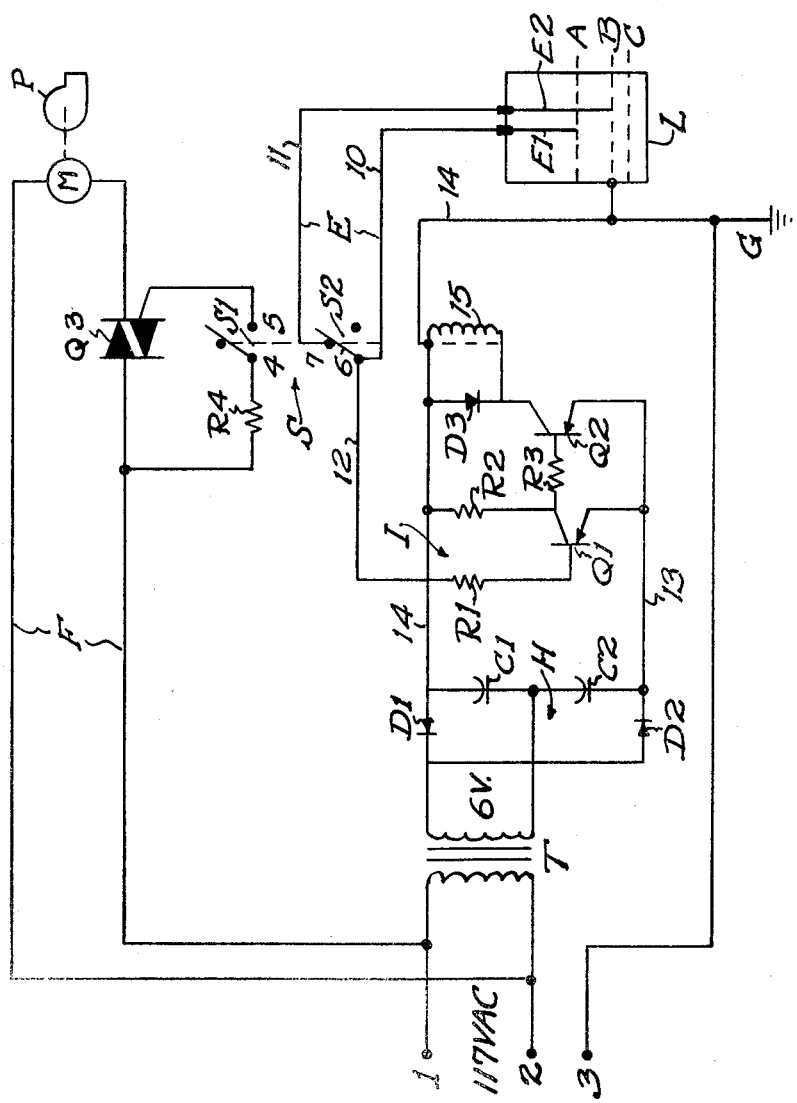

3,509,825
TANK-REFILLING LIQUID LEVEL CONTROL FOR HIGH RESISTIVITY LIQUIDS
Kenneth G. Sorensen, 12118 Ohio St., Los Angeles, Calif. 90025
Continuation-in-part of applications Ser. No. 630,735 and Ser. No. 630,736, both Apr. 13, 1967. This application Mar. 22, 1968, Ser. No. 715,365
The portion of the term of the patent subsequent to Nov. 5, 1985, has been disclaimed and dedicated to the Public
Int. Cl. F04b 49/02
U.S. Cl. 417—36        7 Claims

ABSTRACT OF THE DISCLOSURE

A liquid-holding tank refilling pump driven by an electric motor controlled by a triac under pilot-control by a pair of transistors acting as a snap switch in response to a low voltage current in a control circuit having electrodes for completing the circuit through the liquid in the tank.

RELATED APPLICATIONS

This application is a continuation-in-part of my pending applications Ser. No. 630,735, now Patent No. 3,437,108, filed Apr. 13, 1967, for Tank-Filling Control Circuit and Ser. No. 630,736, filed Apr. 13, 1967, for Fluid Mixing and Tank-Filling System, now Patent No. 3,408,941, issued Nov. 5, 1968.

BACKGROUND OF THE INVENTION

Heretofore I have developed liquid level control circuits, as disclosed in my earlier applications identified above, wherein an NPN transistor, acting as an amplifier in a liquid-level monitoring control circuit, controls the action of a reed relay in effecting switching action of a triac for turning on and off the power circuit of a tank-refilling pump. Such circuits, while quite satisfactory for handling liquids of high conductivity, are not as dependable for handling liquids of high resistivity, which tend to inhibit the full closing of the relay. A broadly similar circuit is shown in my Patent No. 3,252,420 issued May 24, 1966.

OBJECTS OF INVENTION

The general object of the present invention is to provide an improved liquid level control circuit which will operate dependably in handling liquids of high resistivity. Specific objects are:

(1) To utilize a control circuit of very low voltage including such high-resistivity liquid to complete the circuit;

(2) To utilize only a very small current flowing through the liquid, in order to control a power circuit;

(3) To utilize a pair of transistors to function as a snap switch in the control circuit, whereby, when one of the transistors is conductive, no voltage will appear at the relay coil, while the other transistor, when conductive will cause the entire voltage to appear at the relay coil;

(4) To utilize a triac in the power circuit, for turning the motor on and off, whereby high currents are switched without passing through relay points.

SUMMARY OF INVENTION

The present invention is particularly characterized by the use of a pair of PNP transistors in a two-stage relay-control circuit, the transistors cooperatively functioning as a snap switch to turn on and off a sensitive reed relay, the first transistor sensing the liquid level in the tank and becoming non-conductive when the level reaches a low limit, the second transistor becoming conductive when the first transistor becomes non-conductive, and being then operative to energize the relay which in turn biases a triac in the power circuit to conductive state in which it conducts AC power to the pump motor to operate the pump until the liquid in the tank rises to a maximum height, whereupon the first transistor, sensing this liquid level, will become conductive so as to bias the second transistor to non-conductive state, turning off the triac and the pump. The circuit is such that the full potential of a low control voltage is applied to the relay coil and maintained as long as the second transistor is conductive.

DESCRIPTION

The drawing shows a schematic circuit diagram of a tank-refilling apparatus embodying the invention. In general, such apparatus comprises a liquid tank L for holding and dispensing a liquid which may fall and rise in the tank between a high level A, an intermediate level B and a low level C. A represents a level at which a refilling operation is to be cut off; B represents a level to which the liquid can fall without resumption of refilling, and C represents a level, slightly below B, at which the refilling pump is started, in a refilling operation which will continue until the level A is again reached. The apparatus further includes a pump P for pumping the liquid into the tank in a refilling operation, an electric motor M for driving the pump, a triac Q3 for opening and closing a power circuit F for carrying power to pump P from a power source 117VAC, a relay S (e.g. reed relay) having a switch S1 for switching the triac on and off, a pair of PNP transistors Q1 and Q2 conjunctively operative as a snap switch to energize and deenergize the coil of relay S by alternatively conducting full voltage and no voltage from the secondary of a step-down transformer T through a voltage-doubler H in a control circuit I, and electrodes E1 and E2 for sensing the liquid levels in tank L in a sensing circuit E which includes a switch S2 of relay S, for controlling the bias on transistor Q1 so as to control the operation of snap-switch Q1, Q2 in circuit I.

Electrodes E1, E2, depend into tank L from the top of the tank, being insulated from the top as indicated. They are connected, through parallel conductors 10 and 11 of sensing circuit E, to the movable contact (reed) 6 and a fixed contact 7 respectively of switch S2. Sensing circuit E further includes a conductor connection 12 from reed 6 to the base of transistor Q1 through a biasing resistor R1, and a connection from the collector of transistor Q1 through a second resistor R2 to a conductor 14 which is connected to the negative side D1 of doubler H and to the tank L (which may be considered as grounded as indicated at G). The sensing circuit E further includes the liquid in tank L, which completes the circuit from connection 14 to one or the other of parallel sensing circuits (conductors) 10, 11. When the base of transistor Q1 is biased in the negative direction by connection to ground at tank L through resistor R1 and sensing circuit E, transistor Q1 will be forward-biased to conductive condition and will in turn bias transistor Q2 to non-conductive condition. When sensing circuit E is open, removing ground from the base of transistor Q1, the latter will be reverse-biased by voltage transmitted through a conductor connection 13 to the emitter of transistor Q1 from the output circuit of transformer T, and thus turned off. Only a slight current, at the low voltage output of transformer T (e.g. 6 volts) is operative to base bias transistor Q1 to non-conductive condition.

Control circuit I further includes transistor Q2 which, when transistor Q1 conducts, is reverse-biased to non-conductive state by voltage transmitted through a resistor R3, from current in the emitter-collector circuit of transistor Q1, which circuit includes a connection to ground conductor 14 through a resistor R2. The collector of transistor Q2 is connected to ground conductor 14 through coil 15 of relay S. When transistor Q1 becomes non-conductive, the transistor Q2 will be forward-biased (the potential at its base shifted toward the negative) through resistors R2, R3 from the negative side of doubler H, and it will then conduct, its emitter-collector current being supplied to relay coil 15, the entire DC voltage of the doubler output appearing at coil 15. A clamping diode D3, in parallel with coil 15, prevents any induced voltage in coil 15 from appearing across transistor Q2 when the relay is deenergized.

Transformer T includes a primary, connected to power source 117VAC in parallel with motor M, and a secondary delivering its AC output to the voltage doubler H (a full-wave doubler circuit comprising diodes D1, D2 and capacitors C1, C2) which converts the transformer output to a direct current voltage delivered to the conductors 13, 14 of control circuit I.

Relay S includes the switches S1 (normally open) and S2 (normally closed), one of which is open when the other is closed and vice versa, and the energizing coil 15 which is connected in the emitter-collector circuit of transistor Q2 from the output of voltage-doubler circuit H through conductor 13, and back through conductor 14 to the circuit H. When transistor Q2 conducts, its output current passes through the coil of relay S, energizes it, and causes the relay to reverse from the switch positions shown in the drawing. Switches S1 and S2 are self-actuated to normal positions shown in the drawing, in which switch S2 closes the sensing circuit to conductor 11, and switch S1 is open.

Relay S is a highly sensitive relay, operable on the low voltage output of voltage doubler H. A reed relay is satisfactory for the purpose, though other sensitive relays can be employed. Where a reed relay is employed, its armature is a highly flexible reed (strip of highly flexible spring strip metal). It carries the contacts of both switches S1 and S2, i.e., the movable contacts.

Triac Q3 is a full-wave switching unit of a bias-controlled type comprising two silicon-controlled rectifier diodes connected for conduction in opposite directions, each diode conducting a respective half wave. It is bias-controlled by a bias circuit including a bias resistor R4 and the switch S1 of relay S, in series, the circuit being shunted across the triac.

OPERATION

As a starting point, it will be assumed that the level in tank L is at C. When voltage is applied from transformer T, resistors R2 and R3 will supply transistor Q2 with forward bias from the connection to ground through conductor 14, and transistor Q2 will conduct. This will energize the relay S, causing switch S2 to open and switch S1 to close. This will supply triac Q3 with bias current via resistor R4, turning on the triac Q3, which then becomes operative to conduct alternating current from source 117VAC to motor M, thus operating pump P to refill tank T. As the liquid rises in the tank, it will reach point B, touching electrode E2, but since this electrode has been switched out of the sensing circuit E by the opening of switch S2, it will not affect the operation, and refilling will continue.

The liquid will continue to rise until it reaches level A, when it will contact electrode E1, closing the sensing circuit E through conductors 10 and 12 to connect the base of transistor Q1 to ground, thus forward-biasing it to conductive state. The output potential of the positive side D2 of doubler H will then be supplied to the base of transistor Q2, reverse-biasing it to non-conductive state. The delivery of emitter-collector current from transistor Q2 to relay coil 15 will thus be arrested, the relay will be deenergized, and the switches S1, S2 will revert back to their normal positions shown in the drawing, the switch S2 closing on its contact 7 to restore sensing circuit 11 to operative condition, and opening switch S1, taking the bias off triac Q3, rendering it non-conductive, and shutting off the supply of power to motor M, thus arresting the refilling operation.

As liquid is withdrawn from tank T, the level in the tank will drop below level A, but the forward bias on transistor Q1 will be maintained by the restored sensing circuit 11, until the liquid recedes below level B, when circuit 11 will be broken at electrode E2. The base of transistor Q1 will then again be subjected to the positive potential of positive side D2 of doubler H, reverse-biasing it so as to turn it off, thus turning on transistor Q2, which will restore the triac Q3 to conductive state and again start the pump P.

I claim:
1. In a tank-filling system including a tank and an electric motor utilizing current from a conventional alternating current source for driving a tank-filling pump, the improvement which comprises:
  a low-voltage current supply including a step-down transformer powered by said current source and a rectifier for converting the output of said transformer to direct current voltage;
  a switching triac;
  a power circuit including said triac and motor in series with said alternating current source, whereby said triac will conduct current from said source to said motor when rendered conductive;
  a sensitive relay having a normally closed first switch, an energizing coil, and a normally open second switch, said switches being operable in unison so that one is open when the other is closed and vice versa;
  a biasing circuit for said triac including said second switch in series, said biasing circuit being operative to render said triac conductive upon closing of said second switch;
  a pair of liquid level sensing circuits including high and low electrodes in said tank;
  one of said sensing circuits including said low electrode and said first switch in series for starting the tank-filling operation by opening of said normally closed first switch upon breaking of contact between the liquid and said low electrode;
  the other of said sensing circuits including said high electrode and a conductor shunting said first switch for arresting the tank-filling operation upon contact of the liquid with said high electrode;
  and a pair of transistors cooperatively functioning as a snap switch, said pair comprising a first transistor connected to said sensing circuits so as to be biased to completely conductive condition whenever connected to the liquid in said tank through either of said electrodes and a second transistor responsive to the conductive output of said first transistor so as to be biased to completely non-conductive condition when said first transistor is non-conductive;
  said second transistor becoming completely conductive when said first transistor is non-conductive, and being arranged to then deliver its output to said relay coil so as to energize the same, whereby to close said second switch to bias said triac to conductive condition and thus operate said pump in a refilling operation, and to open said first switch so as to open the sensing circuit to said low electrode and render the same inoperative during said refilling operation.

2. A tank-refilling system as defined in claim 1, wherein said first transistor is of the PNP type and said sensing circuits provide connections to the base thereof at ground potential to forward-bias said first transistor to conductive condition when either of said sensing circuits is closed.

3. A tank-filling system as defined in claim 2, wherein said second transistor is of the PNP type and is arranged to be base-biased to non-conductive state by emitter-collector current output of said first transistor.

4. A tank-filling system as defined in claim 1, including an energizing coil in said relay, arranged to receive the emitter-collector current output of said second transistor for operating the relay.

5. A tank-filling system as defined in claim 1, wherein said low-voltage current supply has a primary connected in parallel with said motor to said alternating current source and a secondary delivering 6 volt AC output to said rectifier.

6. A tank-filling system as defined in claim 1, including an energizing coil in said relay, arranged to receive the emitter-collector current output of said second transistor for operating the relay;

and a clamping diode shunted across said coil and operative to prevent any induced voltage in said coil from appearing across said second transistor when said relay is deenergized.

7. A tank-filling system as defined in claim 1, wherein the power circuit to said motor consists of a single triac and conductors connecting said triac in series with said motor and said current source.

References Cited

UNITED STATES PATENTS

| 3,131,335 | 4/1964 | Berglund et al. | 137—392 |
| 3,279,379 | 10/1966 | Klyce | 307—308 |
| 3,351,084 | 11/1967 | Halkiades | 318—482 |
| 3,252,420 | 5/1966 | Sorensen | 103—25 |
| 3,131,335 | 4/1964 | Berglund et al. | 317—148.5 |
| 3,293,505 | 12/1966 | Miller | 317—148.5 |
| 3,335,334 | 8/1967 | Albisser | 317—148.5 |
| 3,408,941 | 5/1968 | Sorensen | 103—25 |

WILLIAM L. FREEH, Primary Examiner

U.S. Cl. X.R.

137—392; 417—44; 418—482